Figure 1:
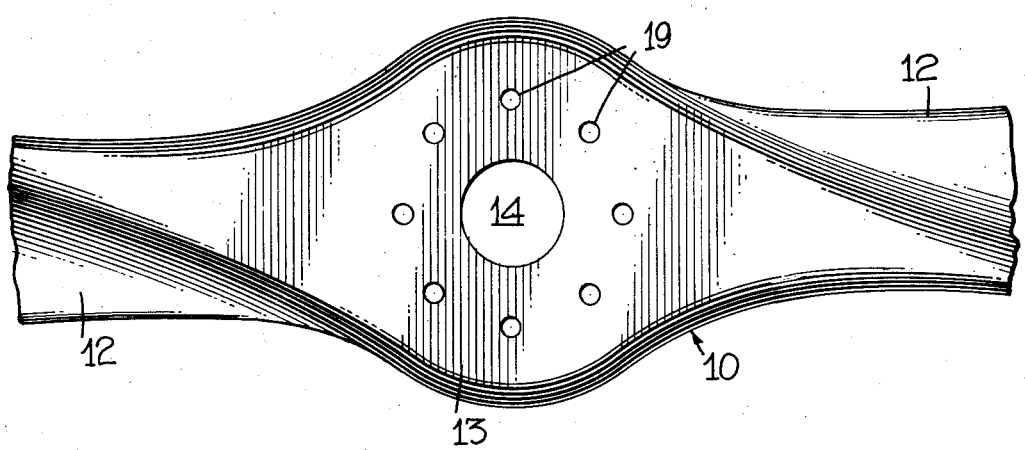

G. H. CURTISS.
PROPELLER.
APPLICATION FILED MAR. 31, 1916.

1,223,321. Patented Apr. 17, 1917.

Inventor
GLENN H. CURTISS.

By
Attorney

UNITED STATES PATENT OFFICE.

GLENN H. CURTISS, OF BUFFALO, NEW YORK, ASSIGNOR TO CURTISS AEROPLANE AND MOTOR CORPORATION, A CORPORATION OF NEW YORK.

PROPELLER.

1,223,321.　　　　　　Specification of Letters Patent.　　　Patented Apr. 17, 1917.

Application filed March 31, 1916.　Serial No. 88,089.

*To all whom it may concern:*

Be it known that I, GLENN H. CURTISS, a citizen of the United States, residing at Buffalo, in the county of Erie and State of New York, have invented certain new and useful Improvements in Propellers, of which the following is a specification.

My invention relates to devices of a construction designed to be rotated at extremely high speeds for propulsion purposes and more particularly to aircraft equipment— *i. e.*, the propeller.

For various reasons, it is desirable, that propellers, tractor or pusher, laminated or otherwise, intended for aircraft equipment be constructed principally of wood or other fibrous material. While propellers so constructed possess certain advantages conducive to increased efficiency when employed in connection with air craft propelling power plants of a limited power capacity, it has been demonstrated conclusively, by actual test, that non-reinforced wood, because of its inherent softness or malleable quality, cannot, if the propeller be used on a high powered engine, withstand without injury, the incessant and uninterrupted crankshaft power impulses. Moreover, in starting and stopping there are extreme strains imposed by the sudden and variable impulses incident to non-uniform operation.

Since the trend of modern development in the aircraft industry is toward larger and accordingly exceedingly high powered machines, it is the principal object of the present invention, to so reinforce, solidify, harden or toughen the hub portion of an all-wood aircraft propeller that it may withstand, without injury, the stresses and strains to which it is continuously subjected during flight.

By solidifying and toughening the hub portion of the propeller, gradual circumferential displacement thereof with respect to its bearing support cannot occur. At present, after continued use, the propeller proper will wear or "give" and as a consequence become circumferentially displaced. Bolts, mounted to pass transversely through the hub portion of the propeller, are commonly utilized to secure the hub bearing to the propeller, each bolt passing not only through said hub portion, but through annular flanges or plates mounted one at each end of the hub bearing to engage with and bear against the opposite faces of the propeller. The wear or "give" above referred to takes place in the immediate proximity to the several bolts, causing the bolt-holes in the hub portion of the propeller to gradually enlarge, resulting in a shearing action on the bolts and sometimes a splitting of the hub. To secure the mentioned toughening or solidifying effect, the propeller is impregnated with a heated liquid resinous substance, which, when cooled and dried will harden, and in consequence of the inherent qualities of resin, render the impregnated portion or portions of the propeller tenacious, solid and exceedingly tough.

The method and process of impregnation will constitute the subject matter of a separate application to be contemporaneously filed.

Figure 2:
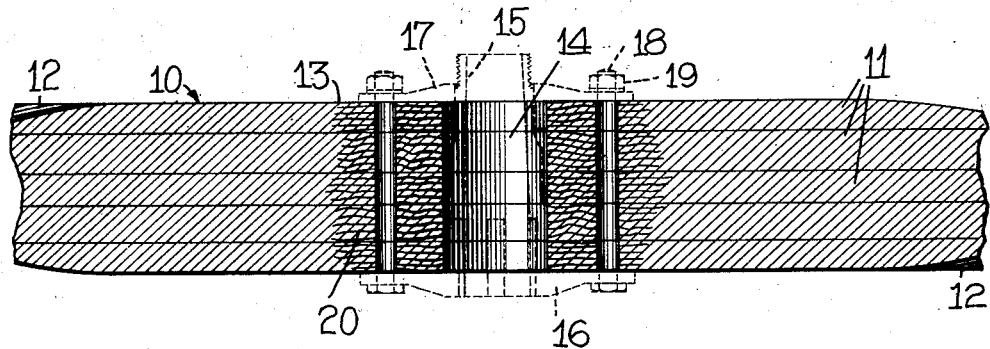

In describing my invention in detail, reference will be had to the accompanying drawing wherein like numerals of reference designate like or corresponding parts throughout the several views, of which:

Figure 1 is an elevation of an aircraft propeller (partly broken away) solidified and toughened at its hub portion, and Fig. 2 is a longitudinal section view illustrating the depth to which the impregnated extraneous reinforcing substance ordinarily penetrates the propeller to effectually and properly reinforce the hub portion thereof.

The propeller herein illustrated and designated as an entirety by the numeral 10, is of the all-wood type comprising the usual laminations 11, blades 12, and integral hub portion 13. An opening or transverse bore 14 of a proper shape and size in cross section is formed in the hub portion 13 to receive the hub-bearing sleeve designated 15 in Fig. 2. While I have illustrated the hub bearing as comprising the sleeve 15, an integral flange or face-plate 16, an axially adjustable face-plate or flange 17 and bolts 18, it is to be understood that such a hub-bearing forms no part of the present invention, being referred to and illustrated that the application and utility of the invention may be respectively illustrated and defined. An annular series of bolt-holes 19 is formed in the hub portion 13 about the concentric opening 14 formed therein to receive the several bolts 18 which pass through the hub portion and secure or clamp the face-plates 16 and 17 in engagement with the propeller. Nuts 19 engage with the several bolts 18 for an obvious purpose.

As hereinbefore pointed out, the boltholes 19 in the hub portion of the propeller wear elliptical or enlarge because of the softness and malleable quality of wood. Such wear is more particularly in evidence where the propeller 10 is rotated at an exceedingly high rate of speed as for instance, when associated with a high powered aeronautical motor. Displacement of the hub bearing in the manner stated is productive of a shearing action between the face-plates 16 and 17 and the bolts.

By impregnating the hub portion as indicated at 20 in Fig. 2 of the drawing with an extraneous substance (resin preferred), the reinforcing or impregnating medium will enter the fibrous wood material, seep in between the laminations of the propeller and fill in all interstices of the hub. It is important to the toughening or hardening of the hub that the resin or other extraneous substance be first heated and liquefied and then forced under pressure into the body of that portion of the propeller adjacent the opening 14 that it may impregnate and penetrate in all directions radially of said opening to consequently, when dry, solidify, toughen and harden the wood.

The process or method of solidifying the hub portion of the propeller may be briefly stated to consist in first tightly incasing the said hub portion and thereafter heating to a temperature equal to or greater than the temperature of the solidifying medium, that portion of the hub incased. Liquefied resin is then forced, under pressure, into the hub opening of the propeller and into the several bolt-holes where it is free to permeate and impregnate by radial penetration such portions of the hub as are in the immediate proximity to the several openings. The depth of penetration is variable at will by variations in the pressure. After impregnation, the casing or inclosing apparatus is removed and the resin allowed to cool and dry.

It may be stated in conclusion that the broad idea of hardening or solidifying the hub portion of an integral all-wood rotating element is essentially novel, particularly where the hub portion is an integral part of the remainder of said element and of a fibrous, permeable quality permitting of impregnation with an extraneous substance such as that pointed out.

While I have evolved and described my invention as applicable to aeronautical propellers, it is to be understood that I do not wish to limit myself in this particular since equally efficacious results are obtainable without regard to the nature of the element reinforced. I, therefore consider novel the subject matter included in the appended claims.

What is claimed is:

1. A fibrous propeller having its hub portion of greater solidity than the blade portions thereof.

2. A propeller having its hub portion impregnated with an extraneous toughening substance.

3. An all-wood propeller having its permeable hub portion solidified by impregnation with an extraneous substance.

4. A propeller having its hub portion solidified by impregnation with a resinous substance.

5. A propeller having such portion or portions thereof as are designed to receive the greatest stresses incident to use solidified and toughened by impregnation with an extraneous substance.

6. A propeller having an integral hub portion of greater solidity and toughness than the blade portions thereof.

7. An all wood article of manufacture having only such portion or portions thereof as are designed to receive the greatest stresses incident to use solidified and toughened by impregnation with an extraneous substance.

8. An all-wood propeller having its hub portion hardened and toughened by impregnation with a resinous substance.

In testimony whereof I affix my signature.

GLENN H. CURTISS.